(12) United States Patent
Wang et al.

(10) Patent No.: US 12,442,963 B2
(45) Date of Patent: Oct. 14, 2025

(54) DISPLAY PANEL COMPRISING A PRIMARY CONTOUR LINE DEFINING AN ACTIVE DISPLAY REGION AND A CLOSED SECONDARY CONTOUR LINE AND DISPLAY DEVICE

(71) Applicants: Beijing BOE Display Technology Co., Ltd., Beijing (CN); BOE Technology Group Co., Ltd., Beijing (CN)

(72) Inventors: Yang Wang, Beijing (CN); Shijun Wang, Beijing (CN); Bo Feng, Beijing (CN); Wenkai Mu, Beijing (CN); Zhan Wei, Beijing (CN); Tengfei Ding, Beijing (CN); Yi Liu, Beijing (CN); Xinlan Yang, Beijing (CN); Jun Fan, Beijing (CN); Li Tian, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 657 days.

(21) Appl. No.: 17/790,626

(22) PCT Filed: Sep. 13, 2021

(86) PCT No.: PCT/CN2021/118005
§ 371 (c)(1),
(2) Date: Jul. 1, 2022

(87) PCT Pub. No.: WO2022/089048
PCT Pub. Date: May 5, 2022

(65) Prior Publication Data
US 2023/0045407 A1    Feb. 9, 2023

(30) Foreign Application Priority Data

Oct. 30, 2020    (CN) .......................... 202011194008.8

(51) Int. Cl.
*G02B 5/20* (2006.01)

(52) U.S. Cl.
CPC .................................... *G02B 5/201* (2013.01)

(58) Field of Classification Search
CPC ................. G02F 2201/56; G02F 2001/133388
See application file for complete search history.

(56) References Cited

U.S. PATENT DOCUMENTS

2009/0115933 A1* 5/2009 Mimura ............ G02F 1/133512
349/59
2009/0309813 A1* 12/2009 Fujita ................... G09G 3/3611
345/55

(Continued)

FOREIGN PATENT DOCUMENTS

CN    105118383 A    12/2015
CN    105911744 A    8/2016

(Continued)

OTHER PUBLICATIONS

PCT/CN2021/118005 international search report and written opinion.

*Primary Examiner* — Paul C Lee
(74) *Attorney, Agent, or Firm* — IPro, PLLC

(57) ABSTRACT

A display panel and a display device are provided. The display panel includes: a primary contour defining an active display region and including first portions extending non-linearly, a secondary contour inside the primary contour and including second portions extending non-linearly; the primary contour is an outer contour after the display panel is lightened; pixels in the active display region include pixels of first type inside the secondary contour, pixels of second type intersecting the second portion, and pixels of third type intersecting the first portion and outside the secondary contour; an aperture ratio of pixels of third type is smaller than that of pixels of first type, an aperture ratio of at least (Continued)

part of pixels of second type is positively correlated with an area of a part, inside the secondary contour, of each pixel of second type.

20 Claims, 3 Drawing Sheets

(56) References Cited

U.S. PATENT DOCUMENTS

| | | | |
|---|---|---|---|
| 2010/0141570 A1* | 6/2010 | Horiuchi | G11C 19/28 345/100 |
| 2010/0141874 A1* | 6/2010 | Morita | G02F 1/133514 349/187 |
| 2019/0019849 A1 | 1/2019 | Zheng et al. | |
| 2021/0335908 A1 | 10/2021 | Chen et al. | |

FOREIGN PATENT DOCUMENTS

| | | | | | |
|---|---|---|---|---|---|
| CN | 107357066 | A | | 11/2017 | |
| CN | 107507519 | A | | 12/2017 | |
| CN | 107703688 | A | * | 2/2018 | ......... G02F 1/13454 |
| CN | 107731099 | A | | 2/2018 | |
| CN | 107741870 | A | * | 2/2018 | ............ G06T 5/005 |
| CN | 107741871 | A | | 2/2018 | |
| CN | 107749244 | A | | 3/2018 | |
| CN | 108400156 | A | | 8/2018 | |
| CN | 110275343 | A | | 9/2019 | |
| KR | 20110067881 | A | | 6/2011 | |
| WO | 2018196081 | A1 | | 11/2018 | |

* cited by examiner

DISPLAY PANEL COMPRISING A PRIMARY CONTOUR LINE DEFINING AN ACTIVE DISPLAY REGION AND A CLOSED SECONDARY CONTOUR LINE AND DISPLAY DEVICE

CROSS-REFERENCE TO RELATED APPLICATION

This application is a U.S. national phase application of a PCT Application No. PCT/CN2021/118005 filed on Sep. 13, 2021, which claims a priority of the Chinese patent application No. 202011194008.8 filed in China on Oct. 30, 2020, the disclosure of which is incorporated herein by reference in its entirety.

TECHNICAL FIELD

The present disclosure relates to the field of display technology, and in particular, relates to a display panel and a display device.

BACKGROUND

In the related art, a display panel includes a plurality of pixel units, each of which at least consists of a green subpixel, a blue subpixel and a red subpixel, and the pixel units form a pixel array to display an image. Along with diversified application of the display panel, it is necessary to adaptively adjust a shape of the display panel in accordance with a specific application scenario. In other words, it is necessary to design a special-shaped, e.g., a spherical panel or a polyhedral panel, panel different from a common rectangular plate-like panel.

Each pixel unit is provided with a certain spatial size, or it has a radial size in terms of a microstructure. However, a contour line of the special-shaped display panel is a smooth plane curve or a smooth space curve. The pixel units arranged along the contour line of the special-shaped display panel, when viewed at a micro-scale, exhibit an obvious sense of zigzag or graininess.

SUMMARY

The present disclosure provides a display panel and a display device.

The present disclosure provides the following technical solutions.

In a first aspect, a display panel is provided. The display panel includes a primary contour line defining an active display region, and a closed secondary contour line inside the primary contour line and not intersecting the primary contour line, wherein the primary contour line is an outer contour after the display panel is lightened; the primary contour line includes one or more first portions extending non-linearly, and the secondary contour line includes one or more second portions extending non-linearly; pixels in the active display region of the display panel include pixels of a first type, pixels of a second type and pixels of a third type, an entirety of the pixels of the first type is located inside the secondary contour line, the pixels of the second type intersect the second portion, and the pixels of the third type intersect the first portion and an entirety of the pixels of the third type is located outside the secondary contour line; and an aperture ratio of the pixels of the third type is smaller than an aperture ratio of the pixels of the first type, and an aperture ratio of at least part of the pixels of the second type is positively correlated with an area of a part, inside the secondary contour line, of each of the pixels of the second type.

In some embodiments, the pixels in the active display region of the display panel are rectangular pixels having a same area.

In some embodiments, the aperture ratio of the pixels of the first type is a first given value, and the aperture ratio of the pixels of the third type is a third given value.

In some embodiments, when an area of a part, inside the secondary contour line, of one pixel of the pixels of the second type is not smaller than a first threshold, the aperture ratio of the one pixel of the pixels of the second type is positively correlated with the area of the part, inside the secondary contour line, of the one pixel of the pixels of the second type, and the first threshold is a product of an area of each of the pixels of the first type and the third given value.

In some embodiments, at least each pixel of the pixels of the second type and the pixels of the third type includes a light-shielding pattern, and an area of the light-shielding pattern is negatively correlated with the aperture ratio of the each pixel.

In some embodiments, the light-shielding pattern is a black matrix pattern, a source/drain metal pattern or a gate metal pattern of the display panel.

In some embodiments, when an area of a part, inside the secondary contour line, of one pixel of the pixels of the second type is not smaller than a first threshold, the aperture ratio of the one pixel of the pixels of the second type is $a*F$, wherein 'a' represents the aperture ratio of each of the pixels of the first type, and 'F' represents a ratio of the area of the part, inside the secondary contour line, of the one pixel of the pixels of the second type to a total area of the one pixel of the pixels of the second type.

In some embodiments, when an area of a part, inside the secondary contour line, of one pixel of the pixels of the second type is not smaller than a first threshold and not greater than a second threshold, the aperture ratio of the one pixel of the pixels of the second type is determined through: providing a plurality of preset relative aperture ratios, the plurality of preset relative aperture ratios being defined as a ratio of preset aperture ratios of pixels to the first given value and expressed as a percentage; obtaining a ratio of an area of a part, inside the secondary contour line, of each pixel of the pixels of the second type to an area of the each pixel of the pixels of the second type, the ratio being in form of a percentage value; comparing the percentage value with the plurality of preset relative aperture ratios, and obtaining one of the preset relative aperture ratios equal to or closest to the percentage value as a relative aperture ratio of the each pixel of the pixels of the second type; and multiplying the relative aperture ratio of the each pixel of the pixels of the second type by the first given value, and obtaining the aperture ratio of the each pixel of the pixels of the second type.

In some embodiments, when an area of a part, inside the secondary contour line, of one pixel of the pixels of the second type is greater than the second threshold, the aperture ratio of the one pixel of the pixels of the second type is equal to the first given value.

In some embodiments, a ratio of the aperture ratio of each of the pixels of the third type to the aperture ratio of each of the pixels of the first type is in a range of 0.03 to 0.31.

In some embodiments, the ratio of the aperture ratio of each of the pixels of the third type to the aperture ratio of each of the pixels of the first type is 0.05.

In some embodiments, the first portion is capable of being translated to coincide with the second portion.

In some embodiments, the second portion is obtained through translating the first portion by at least one pixel pitch in a first direction and then translating the first portion by at least one pixel pitch in a second direction, each of the first direction and the second direction is an extension direction of a side of the pixel, and the first direction is perpendicular to the second direction.

In some embodiments, the second portion is obtained through translating the first portion by one pixel pitch in the first direction and then translating the first portion by one pixel pitch in the second direction.

In some embodiments, pixels of a fourth type are further between the first portion and the second portion, the pixels of the fourth type do not intersect both the first portion and the second portion, and an aperture ratio of each of the pixels of the fourth type is a same as the aperture ratio of each of the pixels of the third type.

In some embodiments, the primary contour line further includes a linear portion, and pixels of a fifth type are in the active display region and closest to the linear portion and do not intersect the primary contour line, wherein an aperture ratio of each of the pixels of the fifth type is equal to the aperture ratio of each of the pixels of the first type; or aperture ratios of the pixels of the fifth type increase gradually in a direction away from the first portion until an aperture ratio of one pixel of the pixels of the fifth type is equal to the aperture ratio of each of the pixels of the first type.

In some embodiments, each pixel in the active display region is composed of at least three subpixels, and colors of the subpixels are not completely same.

In some embodiments, the subpixels of each pixel have a same aperture ratio.

The embodiments of the present disclosure further provide a display device. The display device includes the display panel described above.

REFERENCE SIGN LIST

Figure 1:
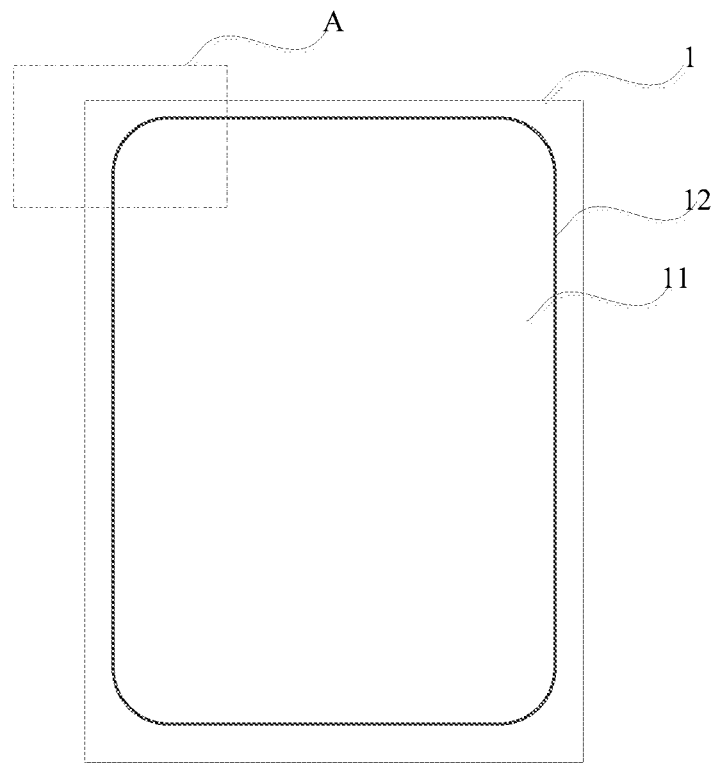
FIG. 1 is a schematic view showing a conventional display panel.
Figure 2:
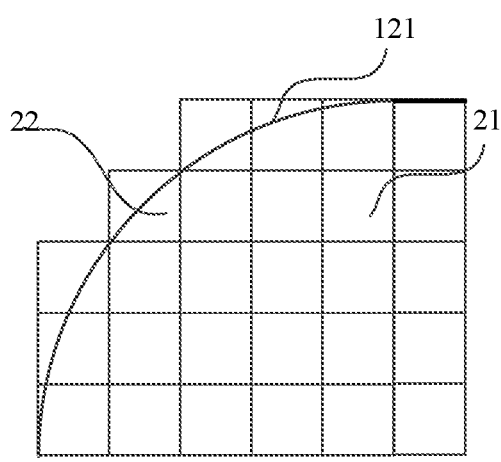
FIG. 2 is an enlarged view of A part in FIG. 1.

1 display panel
11 display region
12 primary contour line
121 first portion
21 pixel in display region
22 pixel at boundary
13 secondary contour line
131 second portion
31 pixel of first type
32 pixel of second type
33 pixel of third type
34 pixel of fourth type
35 pixel of fifth type T1 light-transmitting region
T2 light-shielding pattern

DETAILED DESCRIPTION

In order to make the technical problems to be addressed, the technical solutions and the advantages of the present disclosure more apparent, the present disclosure will be described in detail hereinafter in conjunction with the drawings and embodiments.

In the related art, as shown in FIG. 1, a display panel includes a primary contour line 12 defining an active display region 11. As shown in FIG. 12, the primary contour line 12 includes a boundary having a portion extending non-linearly, i.e., a first portion 121, and the display panel include pixels 21 arranged in the display region and pixels 22 arranged at the boundary. The pixels in the display region are arranged inside the primary contour line 12 and do not intersect the primary contour line 12. The pixels at the boundary 22 are located at a periphery of the active display region 11 and intersect the primary contour line 12.

Usually, a pixel is of a rectangular shape, so the pixel 22 at the boundary adjacent to the first portion 121 covers the first portion 121, and is divided into a part located in the display region (i.e., a part inside the primary contour line 12) and a part located outside the display region (i.e., a part outside the primary contour line 12). When the display panel perform displaying of an image, the part of the pixel 22 in the display region and the part of the pixel 22 outside the display region are both used for the displaying, so an obvious sense of zigzag or graininess exists for the first portion 121 of the primary contour line 12, and thereby a visual effect of a user is adversely affected.

The embodiments of the present disclosure provide a display panel and a display device, which may relieve the sense of zigzag at a periphery of a display region and optimize the visual effect.

The embodiments of the present disclosure provide a display panel, which includes a primary contour line defining an active display region, and a closed secondary contour line arranged inside the primary contour line and not intersecting the primary contour line. The primary contour line is an outer contour after the display panel is lightened. The primary contour line includes at least one first portion extending non-linearly, and the secondary contour line includes at least one second portion extending non-linearly. Pixels in the active display region of the display panel include pixels of a first type, pixels of a second type and pixels of a third type, each pixel of the first type is completely located inside the secondary contour line, each pixel of the second type intersects the second portion, and each pixel of the third type intersects the first portion and is completely located outside the secondary contour line. An aperture ratio of the pixel of the third type is smaller than an aperture ratio of the pixel of the first type, and an aperture ratio of each of at least a part of the pixels of the second type is positively correlated with an area of the pixels of the second type inside the secondary contour line.

The secondary contour line is used to define a position of each pixel of the second type and aperture ratios of the pixels of the second type at different positions, but does not really exist on the display panel.

According to the embodiments of the present disclosure, the secondary contour line is arranged inside the primary contour line. The pixels at the periphery of the display region are at least divided into the pixels of the first type, the pixels of the second type and the pixels of the third type through the primary contour line and the secondary contour line. The pixels of the first type are all located inside the primary contour line, the pixels of the second type intersects a second portion, and the pixels of the third type intersect the first portion and are all located outside the secondary contour line. As a result, during the display, it is able to achieve smooth transition of grayscales at the periphery of the active display region, and relieve the sense of zigzag at the periphery of a display region, thereby to optimize a visual effect.

Optionally, the pixels in the active display region of the display panel are rectangular pixels having the same area.

Optionally, the aperture ratio of the pixels of the first type is a first given value, the aperture ratio of the pixels of the third type is a third given value, and the aperture ratios of the pixels of the second type change with positions of the pixels of the second type.

The aperture ratio of a pixel is defined as a ratio of an area of a light-transmitting part of a unit pixel to an area of the unit pixel. When light irradiating onto the unit pixel has a given light intensity, the larger the aperture ratio of the pixel, the more the light passing through the pixel and the higher the brightness value of the pixel. In contrast, the smaller the aperture ratio of the pixel, the less the light passing through the pixel and the lower the brightness value of the pixel.

Optionally, the aperture ratio of the pixels of the first type is greater than the aperture ratio of the pixels of the third type, and the aperture ratios of the pixels of the second type are not greater than the aperture ratio of the pixels of the first type and not smaller than the aperture ratio of the pixels of the third type. Through adjusting the aperture ratios of the pixels of the second type, it is able to achieve smooth transition of the brightness for the pixels of the second type adjacent to the boundary extending non-linearly, and provide more uniformity display brightness in the vicinity of the boundary extending non-linearly, thereby to weaken a user's perception of a change in the brightness at a periphery of a displayed image, and improve the visual effect of the user when the user watches the displayed image.

Figure 3:
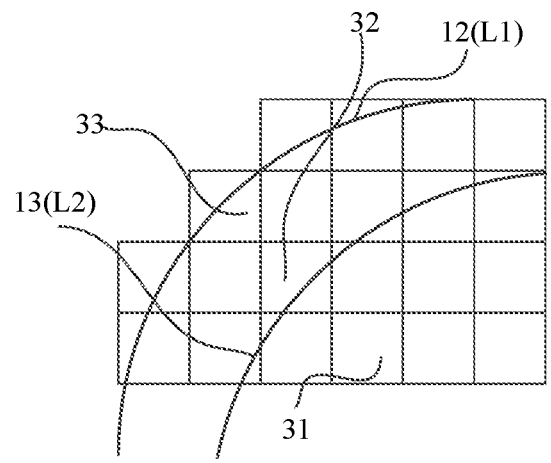
FIG. 3 is a schematic view showing a display panel according to an embodiment of the present disclosure.

To be specific, as shown in FIG. 3, the display panel includes a primary contour line 12 having a first portion L1 extending non-linearly and a secondary contour line 13 having a second portion L2 extending non-linearly, and the first portion L1 is capable of coinciding with the second portion L2 through translation. Pixels in an active display region of the display panel include pixels 31 of a first type, pixels 32 of a second type and pixels 33 of a third type. Pixels 31 of the first type is completely located inside the secondary contour line 13, each pixel 32 of the second type intersects the second portion L2, and each pixel 33 of the third type intersects the first portion L1 and is completely located outside the secondary contour line. An aperture ratio of the pixels 33 of the third type is smaller than an aperture ratio of the pixels 31 of the first type, and an aperture ratio of each pixel 32 of the second type is positively correlated with an area of a part, inside the secondary contour line 13, of the pixel 32 of the second type. In this way, it is able to achieve the smooth transition of the grayscales at the boundary of the display panel extending non-linearly.

Optionally, the aperture ratios of the pixels 32 of the second type are not greater than the aperture ratio of the pixels 31 of the first type, and not smaller than the aperture ratio of the pixels 33 of the third type, so as to achieve the smooth transition of the grayscales at the boundary extending non-linearly in a better manner.

To be specific, illustratively the boundary extending non-linearly includes an arc-shape boundary not matching a shape of a pixel, e.g., a boundary in the form of an arc of a circle, a boundary in the form of an arc of an ellipse, a boundary in the form of a parabola.

Optionally, when the area of the part, inside the secondary contour line, of a pixel of the second type is not smaller than a first threshold, the aperture ratio of the pixel of the second type is positively correlated with the area of the part, inside the secondary contour line, of the pixel of the second type, and the first threshold is a product of an area of each of pixels of the first type and the third given value. In this way, it is able to ensure that the aperture ratio of the pixel of the second type is not smaller than the aperture ratio of the pixels of the third type, thereby to achieve the smooth transition of the grayscales at the boundary extending non-linearly in a better manner. Optionally, when the area of the part, inside the secondary contour line, of a pixel of the second type is smaller than the first threshold, the aperture ratio of the pixel of the second type is equal to the aperture ratio of the pixels of the third type. In this way, it is able to weaken the user's perception of the change in the brightness at a periphery of a displayed image, thereby to achieve the smooth transition of the grayscales at the boundary extending non-linearly in a better manner.

In some embodiments of the present disclosure, at least the pixels of the second type and the pixels of the third type include a light-shielding pattern. The light-shielding pattern is used to shield a part of each of the pixels of the second type and a part of each of the pixels of the third type, so that light does not pass through the shielded part of the pixel of the second type and the shield part of the pixel of the third type. A non-shielded part of the pixel of the second type or the pixel of the third type is a light-transmitting region of the pixel of the second type or the pixel of the third type, the light-transmitting region is used for display of an image. An area of the light-shielding pattern is negatively correlated with the aperture ratio of a pixel. In other words, in the pixels of the second type and the pixels of the third type, the larger the area of the light-shielding pattern, the smaller the aperture ratio of the pixel; and the smaller the area of the light-shielding pattern, the larger the aperture ratio of the pixel.

In actual use, in order to prevent any additional manufacture process and manufacture cost for the display panel 1 during implementing the technical solutions of the embodiments of the present disclosure, the light-shielding pattern is at least any one of a black matrix pattern, a source/drain metal pattern and a gate metal pattern of the display panel, or the light-shielding pattern is formed in a same patterning process as a black matrix pattern, a source/drain metal pattern and a gate metal pattern.

It should be appreciated that, in a possible embodiment of the present disclosure, when the area of the part, inside the secondary contour line, of the pixel of the second type is not smaller than the first threshold, the area of the light-shielding pattern in each pixel of the second type is negatively correlated with the area of the part, inside the secondary contour line, of the pixel of the second type. In other words, the larger the area of the part, inside the secondary contour line, of the pixel of the second type, the smaller the area of the light-shielding pattern of the pixel of the second type, and thereby the larger the aperture ratio of the pixel of the second type; the smaller the area of the part, inside the secondary contour line, of the pixel of the second type, the larger the area of the light-shielding pattern of the pixel of the second type, and thereby the smaller the aperture ratio of the pixel of the second type.

In the embodiments of the present disclosure, each pixel in the active display region of the display panel includes one or more light-transmitting regions.

Figure 4:
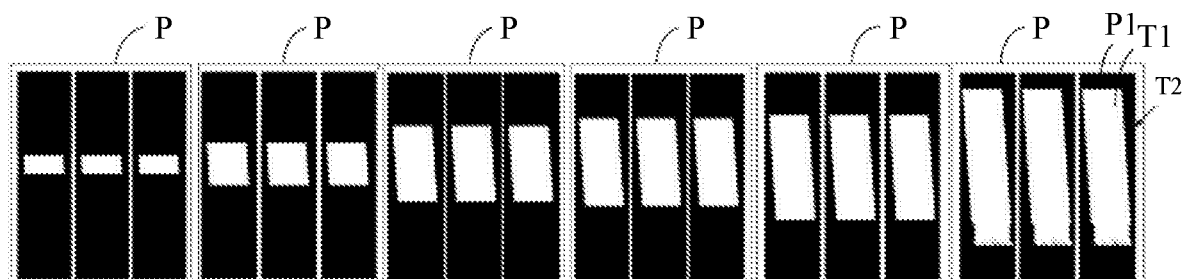
FIGS. 4 and 5 are schematic views showing a plurality of light-transmitting regions arranged in a pixel P according to an embodiment of the present disclosure.

In some embodiments of the present disclosure, as shown in FIG. 4, in the pixels in the active display region of the display panel, each pixel P at least includes three subpixels P1, and colors of the subpixels in each pixel are not completely the same. For example, each pixel includes three subpixels, e.g., a red subpixel, a green subpixel and a blue subpixel, and aperture ratios of the subpixels of each pixel may be the same. The aperture ratio of a subpixel is a ratio of an area of a light-transmitting region of the subpixel to a total area of the subpixel.

As shown in FIG. 4, the pixel P includes three subpixels P1, and each subpixel P1 includes a light-transmitting region T1, i.e., the pixel P includes three light-transmitting regions T1 spaced apart from each other in a widthwise direction of the pixel P, where T2 represents the light-transmitting pattern.

Figure 5:
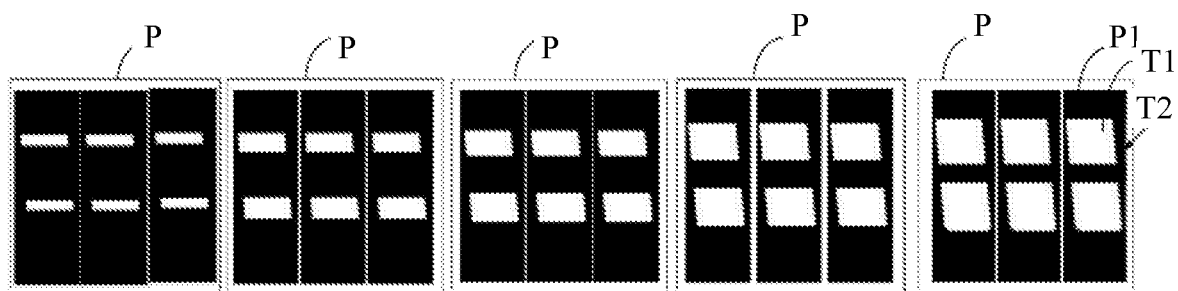

As shown in FIG. 5, each pixel P includes six light-transmitting regions T1. The pixel P includes three subpixels P1, and each subpixel P1 includes two light-transmitting regions T1, i.e., the pixel P includes totally six light-transmitting regions T1 spaced apart from each other in a lengthwise direction of the pixel P. As compared with FIG. 4, the pixel P in FIG. 5 includes more light-transmitting regions T1, and at least for the pixels of the second type and the pixels of the third type, it is able for the light-shielding patterns T2 to be distributed more evenly, and achieve the smoother transition of the brightness, thereby the brightness difference at the periphery of the displayed image is further weaken, and the user is enabled to view a more natural displayed image.

In some embodiments of the present disclosure, when the area of the part, inside the secondary contour line, of the pixel of the second type is not smaller than the first threshold, the aperture ratio of the pixel of the second type is a*F, where a represents the aperture ratio of the pixel of the first type, and F represents a ratio of the area of the part, inside the secondary contour line, of the pixel of the second type to the total area of the pixel of the second type. Optionally, the first threshold is a product of the area of each of the pixels of the first type and the third given value.

In some embodiments of the present disclosure, when the area of the part, inside the secondary contour line, of the pixel of the second type is not smaller than the first threshold and not greater than a second threshold, the aperture ratio of the pixel of the second type is determined through: providing a plurality of preset relative aperture ratios, each of the preset relative aperture ratios being defined as a ratio of a preset aperture ratio to the first given value and expressed as a percentage; obtaining a ratio of the area of the part, inside the secondary contour line, of each pixel of the second type to the total area of the pixel of the second type in the form of a percentage value; comparing the percentage value with the plurality of preset relative aperture ratios, and obtaining the preset relative aperture ratio equal to or closest to the percentage value as a relative aperture ratio of the pixel of the second type; and multiplying the relative aperture ratio of the pixel of the second type by the first given value, and obtaining the aperture ratio of the pixel of the second type.

Optionally, the preset relative aperture ratio is shown as values in Table 1.

TABLE 1

| Preset relative aperture ratio (%) | | | | |
|---|---|---|---|---|
| 1 | 21 | 41 | 61 | 81 |
| 3 | 23 | 43 | 63 | 83 |
| 5 | 25 | 45 | 65 | 85 |
| 7 | 27 | 47 | 67 | 87 |
| 9 | 29 | 49 | 69 | 89 |
| 11 | 31 | 51 | 71 | 91 |
| 13 | 33 | 53 | 73 | 93 |
| 15 | 35 | 55 | 75 | 95 |
| 17 | 37 | 57 | 77 | 97 |
| 19 | 39 | 59 | 79 | 99 |

When the percentage value is close to the preset relative aperture ration, two cases may occur, i.e., the percentage value is greater than the preset relative aperture ratio and the percentage value is smaller than the preset relative aperture ratio. For example, as shown in Table 1, when the percentage value of one pixel of the second type is 35.5, a relative aperture ratio of this pixel of the second type is 35. When the percentage value of one pixel of the second type is 36, the preset relative aperture ratio closed to the percentage value is 35 or 37, and in this condition, as a general selection rule, the preset relative aperture ratio smaller than the percentage value is selected as the relative aperture ratio of this pixel of the second type, or the preset relative aperture ratio greater than the percentage value is selected as the relative aperture ratio of this pixel of the second type, or the preset relative aperture ratio smaller than or greater than the percentage value is randomly selected as the relative aperture ratio of this pixel of the second type.

In some embodiments of the present disclosure, when the area of the part, inside the secondary contour line, of the pixel of the second type is greater than the second threshold, the aperture ratio of the pixel of the second type is equal to the first given value. For example, as shown in Table 1, the second threshold is equal to 99% of the area of the pixel of the second type. When area of the part, inside the secondary contour line, of the pixel of the second type is greater than the second threshold, the aperture ratio of the pixel of the second type is set as to be equal to the first given value. It should be appreciated that, the second threshold may be set according to the practical need. Optionally, the second threshold is set as to be close to the area of the pixel of the second type, e.g., 90%, 95% or 99% of the area of the pixel of the second type, thereby achieving the smoother transition of the grayscales.

Figure 6:
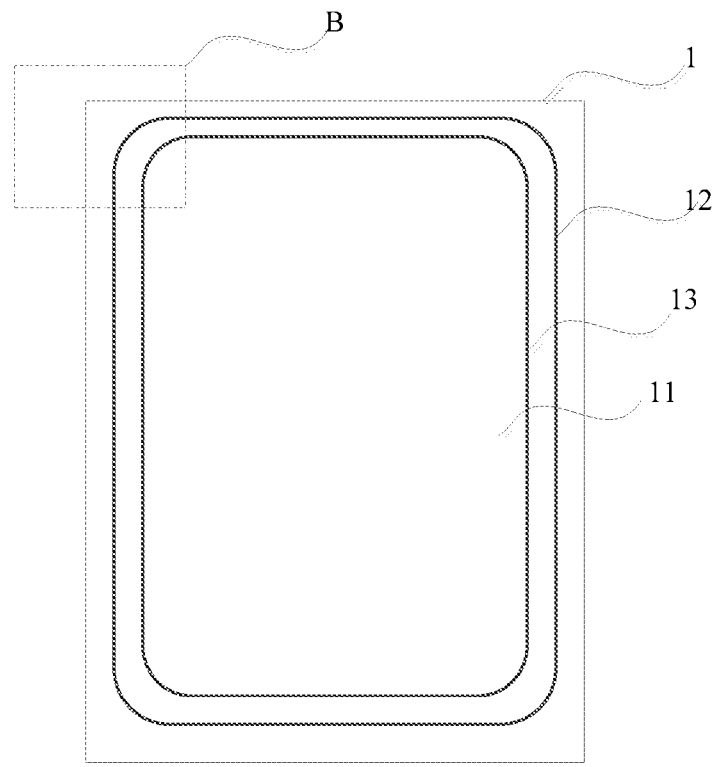
FIG. 6 is another schematic view showing a display panel according to an embodiment of the present disclosure.
Figure 7:
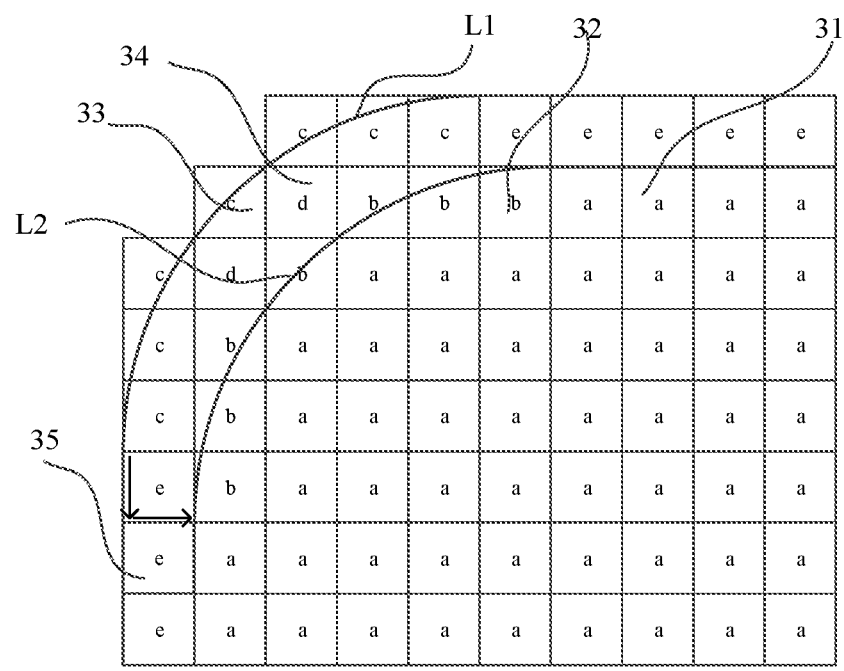
FIG. 7 is an enlarged view of B part in FIG. 6.

To be specific, as shown in FIG. 6, the display panel 1 includes the primary contour line 12 defining the active display region 11. As shown in FIG. 7, the primary contour line 12 includes a boundary extending non-linearly, i.e., the first portion L1. The display panel 1 further includes the secondary contour line 13 arranged inside the primary contour line 12. As shown in FIG. 7, the secondary contour line 13 includes a boundary extending non-linearly, i.e., the second portion L2.

The pixels of the display panel include pixels 31 of the first type, pixels 32 of the second type and pixels 33 of the third type. The pixels 31 of the first type are arranged inside the secondary contour line 13 and do not intersect the second portion L2. The pixels 32 of the second type intersect the second portion L2, and the pixels 33 of the third type intersect the first portion L3.

As compared with the primary contour line 12, the secondary contour line 13 is moved by a certain distance toward a center of the active display region (e.g., a direction indicated by an arrow), but it is necessary to ensure that the same pixel does not intersects both the first portion L1 and the second portion L2.

Optionally, the first portion L1 can be translated to coincide with the second portion L2.

Optionally, the second portion L2 is obtained through translating the first portion L1 by at least one pixel pitch in a first direction and then translating the translated first portion by at least one pixel pitch in a second direction, each of the first direction and the second direction is an extension direction of a side of the pixel, and the first direction is perpendicular to the second direction. In a possible embodiment of the present disclosure, as indicated by an arrow in FIG. 7, the second portion L2 is obtained through translating the first portion L1 by one pixel pitch in the first direction and then translating the first portion by one pixel pitch in the second direction. As shown in FIG. 7, the aperture ratio of the pixel 31 of the first type is marked as a, the aperture ratio of the pixel 32 of the second type is marked as b, and the aperture ratio of the pixel 33 of the third type is marked as c.

In some embodiments of the present disclosure, pixels 34 of a fourth type not intersecting both the first portion and the second portion are further arranged between the first portion L1 and the second portion L2, and an aperture ratio, i.e., d in FIG. 7, of the pixel of the fourth type is the same as the aperture ratio of the pixel of the third type, thereby achieving the smooth transition of the display brightness at the boundary extending non-linearly.

In some embodiments of the present disclosure, the primary contour line further includes a linear portion, and pixels 35 arranged in the active display region, closest to the linear portion, and not intersecting the primary contour line are pixels of the fifth type. As shown in FIG. 7, an aperture ratio of the pixel of the fifth type is marked as e. Optionally, the aperture ratio of the pixels 35 of the fifth type is equal to the aperture ratio of the pixels 31 of the first type. Optionally, in order to achieve better transition of the brightness, the aperture ratios of the pixels 35 of the fifth type increase gradually in a direction away from the first portion until the aperture ratio of the pixel of the fifth type is equal to the aperture ratio of the pixel 31 of the first type. When the aperture ratio of the pixels 35 of the fifth type increase gradually in the direction away from the first portion, it means that, with an increase in distances between the pixels 35 of the fifth type and the first portion, the aperture ratio of two or more pixels of the pixels 35 of the fifth type is kept to be a certain value and then the pixels 35 of the fifth type increase, until the aperture ratio of a pixel 35 is equal to the aperture ratio of the pixel 31 of the first type. A pattern of increasing the aperture ratios of the pixels 35 of the fifth type is not be particularly limited herein, as long as it is able to achieve a transition effect of the aperture ratios.

As shown in FIG. 7, as compared with the primary contour line 12, the secondary contour line 13 is moved by one pixel pitch toward a center of the active display region. The aperture ratio of the pixel 31 of the first type is marked as a, the aperture ratio of the pixel 32 of the second type is marked as b, and the aperture ratio of the pixel 33 of the third type is marked as c.

In some embodiments of the present disclosure, a ratio of the aperture ratio of the pixels of the third type to the aperture ratio of the pixels of the first type is 0.03 to 0.31, e.g., 0.05. In this way, the smooth transition of the brightness of the pixels may be achieved in the vicinity of the boundary extending non-linearly.

According to the display panel in the embodiments of the present disclosure, the plurality of contour lines is arranged at the periphery of the active display region, and the aperture ratios of the pixels at the contour lines are designed. As a result, it is able to weaken the sense of zigzag for a displayed image in the vicinity of the boundary extending non-linearly in the active display region, thereby improving the display quality of the image as well as the user experience.

It should be appreciated that, the display panel in the embodiments of the present disclosure may be a liquid crystal display panel, or a self-luminescence display panel such as an OLED, QLED, or Micro-LED (or Mini-LED) display panel.

The present disclosure further provides in some embodiments a display device including the above-mentioned display panel.

The display device may include, but is not limited to, a radio frequency unit, a network module, an audio output unit, an input unit, a sensor, a display unit, a user input unit, an interface unit, a memory, a processor, and a power source. It should be appreciated that, the display device may not be limited thereto, i.e., may include more or fewer members, or some members may be combined, or the members may be arranged in different modes. In the embodiments of the present disclosure, the display device may include, but is not limited to, a display, a mobile phone, a flat-panel computer, a television, a wearable electronic device or a navigator display device.

The display device may be any product or member having a display function, e.g., a liquid crystal television, a liquid crystal display, a digital photo frame, a mobile phone or a tablet computer. The display device further includes a flexible circuit board, a printed circuit board and a back plate.

The display device in the embodiments of the present disclosure specially refers to a display product with a high screen-to-body ratio, e.g., a full-screen display device or a full-screen smart wearable device. A display region of this kind of product almost occupies an entire display surface, so a boundary of the display region matches a frame of the product. Usually, the display region has a boundary extending non-linearly (e.g., four rounded angles), so it is impossible to match the pixels of a rectangular shape. However, according to the display device in the embodiments of the present disclosure, the secondary contour line is arranged at the periphery of the active display region, and the aperture ratios of the pixels at the primary contour line and the secondary contour line are designed, so as to weaken the sense of zigzag for a displayed image in the active display region in the vicinity of the boundary extending non-linearly, thereby improving the display quality of the image as well as the user experience. Hence, the display device has a high practical value.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner. The same or relevant part may be obtained by referring to description of the product embodiments.

Unless otherwise defined, any technical or scientific term used herein shall have the common meaning understood by a person of ordinary skills in the art to which the present disclosure belongs. Such words as "first" and "second" used in the specification and claims are merely used to differentiate different components rather than to represent any order, number or importance. Such words as "include" or "comprise" intends to indicate that an element or object before the word contains an element or object or equivalents thereof listed after the word, without excluding any other element or object. Such words as "connect/connected to" or "couple/coupled to" may include electrical connection, or direct or indirect connection, rather than to be limited to physical or mechanical connection. Such words as "on", "under", "left" and "right" are merely used to represent relative position relationship, and when an absolute position of a described object is changed, the relative position relationship will be changed accordingly.

It should be appreciated that, in the case that such an element as a layer, a film, a region or a substrate is arranged "on" or "under" another element, it may be directly arranged "on" or "under" the other element, or an intermediate element may be arranged therebetween.

In the above description of the embodiments, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure. Thus, the protection scope of the present disclosure should be consistent with the protection scope of the claims.

What is claimed is:

1. A display panel, comprising:
   a primary contour line defining an active display region, and a closed secondary contour line inside the primary contour line and not intersecting the primary contour line,
   wherein the primary contour line is an outer contour after the display panel is lightened;
   the primary contour line comprises one or more first portions extending non-linearly, and the secondary contour line comprises one or more second portions extending non-linearly;
   pixels in the active display region of the display panel comprise pixels of a first type, pixels of a second type and pixels of a third type, an entirety of the pixels of the first type is located inside the secondary contour line, the pixels of the second type intersect the second portion, and the pixels of the third type intersect the first portion and an entirety of the pixels of the third type is located outside the secondary contour line; and
   an aperture ratio of the pixels of the third type is smaller than an aperture ratio of the pixels of the first type, and an aperture ratio of at least part of the pixels of the second type is positively correlated with an area of a part, inside the secondary contour line, of each of the pixels of the second type.

2. The display panel according to claim 1, wherein the pixels in the active display region of the display panel are rectangular pixels having a same area.

3. The display panel according to claim 2, wherein the aperture ratio of the pixels of the first type is a first given value which is same for all of the pixels of the first type, and the aperture ratio of the pixels of the third type is a third given value which is same for all of the pixels of the third type.

4. The display panel according to claim 3, wherein when an area of a part, inside the secondary contour line, of one pixel of the pixels of the second type is not smaller than a first threshold, the aperture ratio of the one pixel of the pixels of the second type is positively correlated with the area of the part, inside the secondary contour line, of the one pixel of the pixels of the second type, and the first threshold is a product of an area of each of the pixels of the first type and the third given value.

5. The display panel according to claim 1, wherein at least each pixel of the pixels of the second type and the pixels of the third type comprises a light-shielding pattern, and an area of the light-shielding pattern is negatively correlated with the aperture ratio of the each pixel.

6. The display panel according to claim 5, wherein the light-shielding pattern is a black matrix pattern, a source/drain metal pattern or a gate metal pattern of the display panel.

7. The display panel according to claim 4, wherein when an area of a part, inside the secondary contour line, of one pixel of the pixels of the second type is not smaller than a first threshold, the aperture ratio of the one pixel of the pixels of the second type is a*F, wherein 'a' represents the aperture ratio of each of the pixels of the first type, and 'F' represents a ratio of the area of the part, inside the secondary contour line, of the one pixel of the pixels of the second type to a total area of the one pixel of the pixels of the second type.

8. The display panel according to claim 4, wherein when an area of a part, inside the secondary contour line, of one pixel of the pixels of the second type is not smaller than a first threshold and not greater than a second threshold, the aperture ratio of the one pixel of the pixels of the second type is determined through:
   providing a plurality of preset relative aperture ratios, the plurality of preset relative aperture ratios being defined as a ratio of preset aperture ratios of pixels to the first given value and expressed as a percentage;
   obtaining a ratio of an area of a part, inside the secondary contour line, of each pixel of the pixels of the second type to an area of the each pixel of the pixels of the second type, the ratio being in form of a percentage value;
   comparing the percentage value with the plurality of preset relative aperture ratios, and obtaining one of the preset relative aperture ratios equal to or closest to the percentage value as a relative aperture ratio of the each pixel of the pixels of the second type; and
   multiplying the relative aperture ratio of the each pixel of the pixels of the second type by the first given value, and obtaining the aperture ratio of the each pixel of the pixels of the second type.

9. The display panel according to claim 8, wherein when an area of a part, inside the secondary contour line, of one pixel of the pixels of the second type is greater than the second threshold, the aperture ratio of the one pixel of the pixels of the second type is equal to the first given value.

10. The display panel according to claim 1, wherein a ratio of the aperture ratio of each of the pixels of the third type to the aperture ratio of each of the pixels of the first type is in a range of 0.03 to 0.31.

11. The display panel according to claim 10, wherein the ratio of the aperture ratio of each of the pixels of the third type to the aperture ratio of each of the pixels of the first type is 0.05.

12. The display panel according to claim 1, wherein the first portion is capable of being translated to coincide with the second portion.

13. The display panel according to claim 12, wherein the second portion is obtained through translating the first portion by at least one pixel pitch in a first direction and then translating the first portion by at least one pixel pitch in a second direction, each of the first direction and the second direction is an extension direction of a side of the pixel, and the first direction is perpendicular to the second direction.

14. The display panel according to claim 13, wherein the second portion is obtained through translating the first portion by one pixel pitch in the first direction and then translating the first portion by one pixel pitch in the second direction.

15. The display panel according to claim 1, wherein pixels of a fourth type are further between the first portion and the second portion, the pixels of the fourth type do not intersect both the first portion and the second portion, and an aperture ratio of each of the pixels of the fourth type is a same as the aperture ratio of each of the pixels of the third type.

16. The display panel according to claim 1, wherein the primary contour line further comprises a linear portion, and pixels of a fifth type are in the active display region and closest to the linear portion and do not intersect the primary contour line,
wherein an aperture ratio of each of the pixels of the fifth type is equal to the aperture ratio of each of the pixels of the first type; or
aperture ratios of the pixels of the fifth type increase gradually in a direction away from the first portion until an aperture ratio of one pixel of the pixels of the fifth type is equal to the aperture ratio of each of the pixels of the first type.

17. The display panel according to claim 1, wherein each pixel in the active display region is composed of at least three subpixels, and colors of the subpixels are not completely same.

18. The display panel according to claim 17, wherein the subpixels of each pixel have a same aperture ratio.

19. A display device, comprising:
a display panel, wherein, the display panel comprises:
a primary contour line defining an active display region, and a closed secondary contour line inside the primary contour line and not intersecting the primary contour line,
wherein the primary contour line is an outer contour after the display panel is lightened;
the primary contour line comprises one or more first portions extending non-linearly, and the secondary contour line comprises one or more second portions extending non-linearly;
pixels in the active display region of the display panel comprise pixels of a first type, pixels of a second type and pixels of a third type, an entirety of the pixels of the first type is located inside the secondary contour line, the pixels of the second type intersect the second portion, and the pixels of the third type intersect the first portion and an entirety of the pixels of the third type is located outside the secondary contour line; and
an aperture ratio of the pixels of the third type is smaller than an aperture ratio of the pixels of the first type, and an aperture ratio of at least part of the pixels of the second type is positively correlated with an area of a part, inside the secondary contour line, of each of the pixels of the second type.

20. The display panel according to claim 1, wherein each pixel in the active display region is composed of a red subpixel, a green subpixel, and a blue subpixel.

* * * * *